United States Patent
Sakamura et al.

(10) Patent No.: US 12,473,415 B2
(45) Date of Patent: Nov. 18, 2025

(54) POLYOLEFIN-BASED RESIN EXPANDED BEADS, MOLDED ARTICLE OF POLYOLEFIN-BASED RESIN EXPANDED BEADS AND METHOD FOR PRODUCING POLYOLEFIN-BASED RESIN EXPANDED BEADS

(71) Applicant: JSP CORPORATION, Tokyo (JP)

(72) Inventors: Takumi Sakamura, Sano (JP); Naoki Mochida, Narita (JP); Akinobu Hira, Yokkaichi (JP)

(73) Assignee: JSP CORPORATION, Tokyo (JP)

( * ) Notice: Subject to any disclaimer, the term of this patent is extended or adjusted under 35 U.S.C. 154(b) by 1021 days.

(21) Appl. No.: 17/439,258

(22) PCT Filed: Mar. 9, 2020

(86) PCT No.: PCT/JP2020/010123
§ 371 (c)(1),
(2) Date: Apr. 6, 2022

(87) PCT Pub. No.: WO2020/189389
PCT Pub. Date: Sep. 24, 2020

(65) Prior Publication Data
US 2023/0203263 A1 Jun. 29, 2023

(30) Foreign Application Priority Data
Mar. 19, 2019 (JP) .................. 2019-051216

(51) Int. Cl.
*C08J 9/18* (2006.01)
*C08J 3/22* (2006.01)
(Continued)

(52) U.S. Cl.
CPC ............... *C08J 9/18* (2013.01); *C08J 3/226* (2013.01); *C08J 9/0004* (2013.01); *C08J 9/122* (2013.01);
(Continued)

(58) Field of Classification Search
CPC ... C08J 9/18; C08J 9/0004; C08J 9/122; C08J 9/228; C08J 3/226; C08J 2323/00–36;
(Continued)

(56) References Cited

U.S. PATENT DOCUMENTS 6,133,331 A * 10/2000 Oikawa ............... C08J 9/18
521/85
9,034,933 B2 5/2015 Nakayama et al.
(Continued)

FOREIGN PATENT DOCUMENTS

JP H4-359037 A 12/1992
JP 2010-037432 A 2/2010
(Continued)

OTHER PUBLICATIONS

Firebrake ZB TDS (Year: 1997).*
(Continued)

*Primary Examiner* — Christina H.W. Rosebach
(74) *Attorney, Agent, or Firm* — Oliff PLC

(57) ABSTRACT

A molded article of polyolefin-based resin expanded beads having excellent appearance and further suppressed color unevenness is provided.
Polyolefin-based resin expanded beads obtained by expanding polyolefin-based resin particles including one or two or more metal borates selected from zinc borate and magnesium borate, wherein the particles of the metal borate has an arithmetic average particle diameter based on the number of 1 μm or more, and a number rate of the particles of the metal borate having a particle diameter of 5 μm or more is 20% or
(Continued)

less. A method for producing polyolefin-based resin expanded beads by releasing expandable polyolefin-based resin particles containing one or two or more metal borates selected from zinc borate and magnesium borate and a physical blowing agent dispersed in an aqueous medium in a closed vessel together with the aqueous medium from the closed vessel to a low pressure region than an inside of the closed vessel to expand the expandable polyolefin-based resin particles, the method comprising: using a metal borate having an arithmetic average particle diameter based on the number of 1 μm or more and a number rate of the particles having a particle diameter of 5 μm or more of 20% or less as the metal borate.

10 Claims, 1 Drawing Sheet

(51) Int. Cl.
  *C08J 9/00*    (2006.01)
  *C08J 9/12*    (2006.01)
  *C08J 9/228*   (2006.01)
  *C08K 3/38*    (2006.01)
  *B29C 44/44*   (2006.01)
  *B29K 23/00*   (2006.01)
  *B29K 105/04*   (2006.01)

(52) U.S. Cl.
  CPC ............. *C08J 9/228* (2013.01); *C08K 3/38* (2013.01); *B29C 44/44* (2013.01); *B29K 2023/06* (2013.01); *B29K 2023/12* (2013.01); *B29K 2105/048* (2013.01); *C08J 2203/06* (2013.01); *C08J 2203/22* (2013.01); *C08J 2323/14* (2013.01); *C08K 2003/387* (2013.01)

(58) Field of Classification Search
  CPC .............. C08K 3/38; C08K 2003/387; B29K 2105/048
  See application file for complete search history.

(56) References Cited

U.S. PATENT DOCUMENTS

| | | | |
|---|---|---|---|
| 10,907,022 B2 | | 2/2021 | Treat et al. |
| 2013/0217794 A1 | * | 8/2013 | Ravestyn .............. C08J 9/141 521/142 |

FOREIGN PATENT DOCUMENTS

| | | | | |
|---|---|---|---|---|
| JP | 2012-107148 | A | | 6/2012 |
| JP | 2017179212 | A | * 10/2017 | ............... C08J 9/18 |
| JP | 2018-531305 | A | | 10/2018 |
| WO | 1998/025996 | A1 | | 6/1998 |
| WO | 2011/086937 | A1 | | 7/2011 |

OTHER PUBLICATIONS

Borax. Firebrake ZB. 1997. Accessed at https://www.tri-iso.com/documents/riotinto_firebrake_zb_TDS.pdf. (Year: 1997).*
Translation of JP 2017179212 by Shima et al. (Year: 2017).*
May 19, 2020 International Search Report issued in International Patent Application No. PCT/JP2020/010123.

* cited by examiner

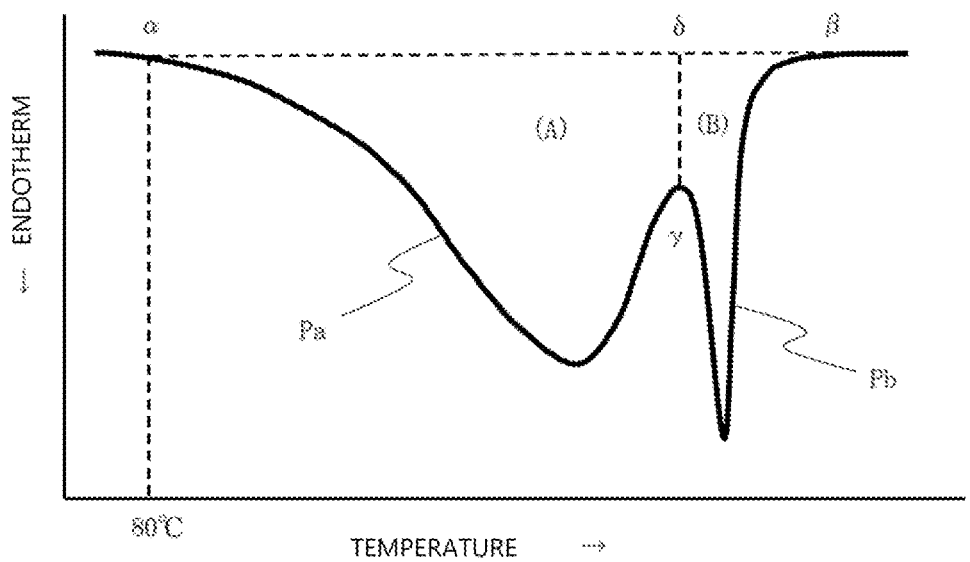

POLYOLEFIN-BASED RESIN EXPANDED BEADS, MOLDED ARTICLE OF POLYOLEFIN-BASED RESIN EXPANDED BEADS AND METHOD FOR PRODUCING POLYOLEFIN-BASED RESIN EXPANDED BEADS

TECHNICAL FIELD

The present invention relates to polyolefin-based resin expanded beads, a molded article of polyolefin-based resin expanded beads, and a method for producing polyolefin-based resin expanded beads.

BACKGROUND ART

As a method for producing an expanded molded article of polyolefin-based resin, for example, the following method is known. A large number of expanded beads are filled in a molding mold. Then, when the expanded beads filled in the molding mold are heated, the expanded beads are further secondarily expanded to fill voids between the expanded beads, and the expanded beads are fusion-bonded to each other. A molded article is produced by such an in-mold molding method.

As such a molded article (Hereinafter, it is also referred to as a molded article of expanded beads) obtained by in-mold molding of polyolefin-based resin expanded beads, a technique for obtaining a molded article excellent in appearance has been heretofore studied. Patent Literature 1 discloses polyolefin-based resin expanded beads including a polyolefin-based resin as a base material resin, the polyolefin-based resin expanded beads containing a metal borate. According to Patent Literature 1, it is possible to obtain polyolefin-based resin expanded beads having a uniform cell size while having a high expansion ratio. When the molded article of expanded beads is produced using such polyolefin-based resin expanded beads, a molded article of expanded beads excellent in appearance can be obtained, from the viewpoint of suppressing occurrence of color unevenness in the molded article of expanded beads.

CITATION LIST

Patent Literature

Patent Literature 1: Japanese Patent (JP-B) No. 3638960

SUMMARY OF INVENTION

Technical Problem

In recent years, the number of cases where molded articles of polyolefin-based resin expanded beads are disposed at a place exposed to the eyes of many people is further increasing. For example, an interior material for an automobile such as a tool box or a luggage box mounted on an automobile is known as an article configured using a molded article of polyolefin-based resin expanded beads. Such molded articles have been widely used in conspicuous positions in an automobile interior. For these reasons, it is required to provide a molded article of polyolefin-based resin expanded beads having a more excellent appearance than the molded article of polyolefin-based resin expanded beads obtained in Patent Literature 1.

An object of the present invention is to obtain a molded article of polyolefin-based resin expanded beads having excellent appearance and further suppressed color unevenness.

Solution to Problem

Polyolefin-based resin expanded beads of the present invention is expanded beads obtained by expanding polyolefin-based resin particles including one or two or more metal borates selected from zinc borate and magnesium borate, wherein the particles of the metal borate has an arithmetic average particle diameter based on the number of 1 μm or more, and a number rate of the particles of the metal borate having a particle diameter of 5 μm or more is 20% or less.

Furthermore, a method for producing polyolefin-based resin expanded beads of the present invention is a method for producing polyolefin-based resin expanded beads by releasing expandable polyolefin-based resin particles containing one or two or more metal borates selected from zinc borate and magnesium borate and a physical blowing agent dispersed in an aqueous medium in a closed vessel together with the aqueous medium from the closed vessel to a low pressure region than an inside of the closed vessel to foam and expand the expandable polyolefin-based resin particles, the method comprising: using a metal borate having an arithmetic average particle diameter based on the number of 1 μm or more and a number rate of the particles having a particle diameter of 5 μm or more of 20% or less as the metal borate.

Advantageous Effects of Invention

The polyolefin-based resin expanded beads of the present invention can be molded in the mold to obtain a molded article of expanded beads having a more excellent appearance.

BRIEF DESCRIPTION OF DRAWINGS

FIG. 1 is an example of a DSC curve of polyolefin-based resin expanded beads of the present invention measured based on a heat flux differential scanning calorimetry method.

DESCRIPTION OF EMBODIMENTS

The polyolefin-based resin expanded beads of the present invention are expanded beads obtained by expanding polyolefin-based resin particles containing a cell controlling agent. Hereinafter, in the present description, the polyolefin-based resin expanded beads and the polyolefin-based resin particles may be simply described as expanded beads and resin particles, respectively.

(Polyolefin-Based Resin Particles)

Examples of the base material resin included the polyolefin-based resin particles include a polypropylene-based resin and a polyethylene-based resin.

Examples of the polypropylene-based resin include a propylene homopolymer and a propylene-based copolymer containing a propylene-derived structural unit in an amount of more than 50 mass %. Specific examples of the propylene-based copolymer include copolymers of propylene and ethylene or an α-olefin having 4 or more carbon atoms, such as a propylene-ethylene copolymer, a propylene-butene copolymer, and a propylene-ethylene-butene copolymer, propylene-acrylic acid copolymers, and propylene-maleic anhydride copolymers. These copolymers may be any of a block copolymer, a random copolymer, and a graft copolymer.

Examples of the polyethylene-based resin include an ethylene homopolymer and an ethylene-based copolymer containing a structural unit derived from ethylene in amount of more than 50 mass %. Specific examples of the polyethylene-based resin include low-density polyethylene, high-density polyethylene, linear low-density polyethylene, very-low-density polyethylene, an ethylene-vinyl acetate copolymer, an ethylene-methyl methacrylate copolymer, an ethylene-methacrylic acid copolymer, and an ionomer-based resin obtained by crosslinking molecules of an ethylene-methacrylic acid copolymer with a metal ion. When the polyethylene-based resin is a copolymer, the copolymer may be any of a block copolymer, a random copolymer, and a graft copolymer.

The polymer may be crosslinked, but is preferably non-crosslinked.

(Cell Controlling Agent)

The metal borate serves as a core at the time of cell generation when polyolefin-based resin particles are foamed and expanded, and acts as a cell controlling agent for controlling the number of cells and the like of the resulting expanded beads.

(Metal Borate)

In the present invention, at least one kind selected from zinc borate and magnesium borate is used as the metal borate. When the metal borate is used as the cell controlling agent, the compounds that can be used as the metal borate can be used singly, or in combination of two or more kinds thereof. Preferably, the metal borate is at least one kind selected from zinc borate and magnesium borate.

The zinc borate is a generic term for metal salts containing boron that bonds to oxygen and zinc. Examples of zinc borate include zinc metaborate [$Zn(BO_2)_2$] and basic zinc borate ($ZnB_4O_7 \cdot 2ZnO$). Examples of zinc borate include zinc borate represented by chemical formulae such as $2ZnO \cdot 3B_2O_3 \cdot 3.5H_2O$ and $3ZnO \cdot 2B_2O_3 \cdot 5H_2O$, but are not limited thereto.

The magnesium borate is a generic term for metal salts containing boron that bonds to oxygen and magnesium. Examples of the magnesium borate include magnesium orthoborate [$Mg_3(BO_3)_2$], magnesium diborate (magnesium pyroborate) [($Mg_2B_2O_5$) or ($2MgO \cdot B_2O_3$)], magnesium metaborate [$MgO \cdot B_2O_3$], trimagnesium tetraborate [($Mg_3B_4O_9$) or ($3MgO \cdot 2B_2O_3$)], pentamagnesium tetraborate [$Mg_5B_4O_{11}$], and magnesium hexaborate [$MgB_6O_{10}$]. Examples of magnesium borate include magnesium borate represented by chemical formulae such as $2MgO \cdot 3B_2O_3 \cdot nH_2O$ (where n is a positive integer), $MgO \cdot 4B_2O_3 \cdot 3H_2O$, and $MgO \cdot 6B_2O_3.18H_2O$, but are not limited thereto.

Among these metal borates, zinc borate represented by a chemical formula such as $2ZnO \cdot 3B_2O_3.3.5H_2O$ or $3ZnO \cdot 2B_2O_3.5H_2O$ is particularly effective as the cell controlling agent.

(Particle Size Distribution of Metal Borate)

The Metal borate has an arithmetic average particle diameter based on the number (Hereinafter, it is also simply referred to as an average particle diameter) of 1 μm or more, and a number rate of particles having a particle diameter of 5 μm or more in the metal borate is 20% or less. As a result of intensive studies by the present inventors, it has been found that it is necessary to further improve the uniformity of cells of the expanded beads included the molded article of expanded beads in order to reduce the color unevenness of the molded article of expanded beads as compared with the conventional molded article of expanded beads. It was found that when the particle size distribution of the metal borate is within the range, the uniformity of the cells of the expanded beads is further improved, and as a result, a molded article of expanded beads having a good appearance with less color unevenness due to variations in cells of the expanded beads can be obtained. It was also found that color unevenness can be reduced on the cut surface of the molded article of expanded beads.

When the average particle diameter of the metal borate is too small, the metal borate is likely to aggregate in the base material resin, and as a result, the uniformity of cells of the expanded beads is deteriorated, and color unevenness of the resulting molded article of expanded beads may be increased. From such a viewpoint, the average particle diameter of the metal borate is 1 μm or more, preferably 1.5 μm or more.

Particles of a metal borate having a particle diameter of more than 5 μm may cause variations in cells of the expanded beads. From such a viewpoint, the rate based on the number of particles of the metal borate having a particle diameter of 5 μm or more is 20% or less, preferably 15% or less, and more preferably 12% or less.

From the viewpoint of suppressing aggregation of the metal borate, the upper limit of the average particle diameter of the metal borate is not particularly limited, and is preferably 5 μm, and more preferably 3 μm or less.

(Measurement of Particle Size Distribution Based on Number of Particles of Metal Borate)

On the basis of the particle size distribution based on the volume measured by a laser diffraction scattering method, the shape of the particles is assumed as a sphere and converted into the particle size distribution based on the number, whereby the particle size distribution based on the number can be obtained. Then, the arithmetic average particle diameter based on the number can be obtained by arithmetically averaging the particle diameters based on the particle size distribution based on the number. In addition, the number rate of particles having a particle diameter of 5 μm or more can be determined from the particle size distribution based on the number. The particle diameter means the diameter of a virtual sphere having the same volume as the particle.

(Content of Metal Borate in Expanded Beads)

The metal borate remains in the expanded beads obtained by expanding the polyolefin-based resin particles containing the metal borate. That is, the expanded beads contain a metal borate. In the expanded beads, the content of the metal borate in the expanded beads is preferably 50 ppm by mass or more and 5000 ppm by mass or less. When the content of the metal borate in the expanded beads is 50 ppm by mass or more, the metal borate acts more effectively as the cell controlling agent, and the expanded beads have a more uniform cell structure. When the content of the metal borate in the expanded beads is 5000 ppm by mass or less, the cells of the expanded beads can be suppressed from becoming excessively fine. From the viewpoint of further enhancing these effects, the content of the metal borate in the expanded beads is more preferably 100 ppm by mass or more and 2000 ppm by mass or less, and still more preferably 150 ppm by mass or more and 1500 ppm by mass or less.

(Method for Producing Polyolefin-Based Resin Expanded Beads)

The polyolefin-based resin expanded beads are produced by expanding unexpanded polyolefin-based resin particles.

Specifically, expandable polyolefin-based resin particles containing one or two or more metal borates selected from zinc borate and magnesium borate and a physical blowing agent dispersed in an aqueous medium in a closed vessel are released together with the aqueous medium from the closed vessel to a low pressure region than the inside of the closed vessel to foam and expand the expandable polyolefin-based resin particles, whereby polyolefin-based resin expanded beads can be produced.

(Production of Polyolefin-Based Resin Expanded Beads)

In the production of polyolefin-based resin expanded beads, polyolefin-based resin particles containing a metal borate are prepared as follows. A metal borate as the cell controlling agent and a base material resin are supplied to an extruder, the base material resin is melted in the extruder, and the base material resin and the metal borate are kneaded to obtain a melt-kneaded product. The melt-kneaded product is extruded from an extruder, and the extruded product is cut at an appropriate size to obtain polyolefin-based resin particles. The method for adding the metal borate is not particularly limited, but the metal borate is preferably supplied to the extruder together with the base resin in the form of a master batch containing the metal borate. The method for producing the polyolefin-based resin particles described herein is an example, and the present invention is not limited thereto.

(Dispersion Step)

Resin particles containing a metal borate are dispersed in an aqueous medium in a closed vessel. As the closed vessel, for example, an autoclave can be used.

(Aqueous Medium)

As the aqueous medium for dispersing the resin particles, water is usually employed, but for example, an alcohol, a glycol, and glycerin can also be employed.

(Dispersant and the Like)

When the resin particles are dispersed in an aqueous medium in a closed vessel, a dispersant can be added to the aqueous medium. Examples of the dispersant include inorganic substances hardly soluble in water such as aluminum oxide, tribasic calcium phosphate, magnesium pyrophosphate, zinc oxide, kaolin, and mica, and water-soluble polymeric protective colloid agents such as polyvinyl pyrrolidone, polyvinyl alcohol, and methyl cellulose. These are used singly or in combination of two or more kinds thereof.

When the resin particles are dispersed in an aqueous medium in a closed vessel, a surfactant such as an anionic surfactant such as sodium dodecylbenzene sulfonate or sodium alkane sulfonate can be used.

(Impregnation Step of Blowing Agent)

In a closed vessel, resin particles dispersed in an aqueous medium are impregnated with a physical blowing agent to obtain expandable polyolefin-based resin particles (Hereinafter, it is also simply referred to as expandable resin particles).

The addition of the physical blowing agent into the closed vessel may be performed before the resin particles are expanded. For example, when carbon dioxide is used as the physical blowing agent, carbon dioxide may be added to the aqueous medium together with the resin particles in the form of dry ice, or may be press-fitted into the sealed vessel in a gaseous state.

The impregnation of the resin particles with the physical blowing agent is preferably performed under heating and/or pressure.

(Physical Blowing Agent)

As the physical blowing agent, an inorganic physical blowing agent and/or an organic physical blowing agent can be used. Examples of the inorganic physical blowing agent include carbon dioxide, air, nitrogen, helium, and argon. Examples of the organic physical blowing agent include aliphatic hydrocarbons such as propane, butane, and hexane, alicyclic hydrocarbons such as cyclopentane and cyclohexane, halogenated hydrocarbons such as methyl chloride, ethyl chloride, methylene chloride, 2,3,3,3-tetrafluoro-1-propene, and trans-1,3,3,3-tetrafluoro-1-propene.

These physical blowing agents may be used singly, or in combination of two or more kinds thereof. Among these blowing agents, a blowing agent containing an inorganic physical blowing agent such as carbon dioxide, nitrogen, or air as a main component is preferably used, and carbon dioxide is more preferably used. In the present invention, containing the inorganic physical blowing agent as a main component means that the physical blowing agent contains the inorganic physical blowing agent in amount of 50 mol % or more. The physical blowing agent preferably contains the inorganic physical blowing agent in an amount of 70 mol % or more, more preferably contains in an amount of 90 mol % or more, and it is still more preferable that the physical blowing agent contains only the inorganic physical blowing agent.

The addition amount of the physical blowing agent is appropriately selected according to the kind of the polyolefin-based resin, the kind of the blowing agent, the apparent density of the intended expanded beads, and the like. For example, when carbon dioxide is used as the physical blowing agent, the addition amount of carbon dioxide is preferably 0.1 parts by mass or more and 30 parts by mass or less, more preferably 0.5 parts by mass or more and 15 parts by mass or less, and still more preferably 1 part by mass or more and 10 parts by mass or less with respect to 100 parts by mass of the polyolefin-based resin particles.

(Expanding Step)

The expandable resin particles containing a blowing agent are released together with an aqueous medium from the closed vessel to a low pressure region than the inside of the closed vessel to foamed and expand the expandable resin particles. It is considered that the aqueous medium absorbed by the metal borate contributes to the growth of a cell when the resin particles containing the metal borate are expanded. It is considered that when the metal borate having the particle size distribution is used as the cell controlling agent, the action of the aqueous medium on the cell growth is equalized, and as a result, expanded beads excellent in uniformity of the cell diameter are obtained.

The temperature of the content in the closed vessel when the expandable resin particles are released from the closed vessel together with the aqueous medium, that is, the temperature (expanding temperature) at which the expandable resin particles are expanded is preferably in a range from a temperature 15° C. lower than the melting point (Tm) (Tm−15° C.) to a temperature 10° C. higher than the melting end temperature (Te) (Te+10° C.), when the melting point of the polypropylene-based resin is Tm and the melting end temperature is Te. The difference between the pressure in the closed vessel and the pressure in the release atmosphere is preferably 1.0 MPa or more and 7.0 MPa or less, and more preferably 1.5 MPa or more and 5.0 MPa or less.

The melting point and the melting end temperature of the polyolefin-based resin respectively mean a melting peak temperature and an extrapolated melting end temperature measured on the basis of heat flux differential scanning calorimetry described in JIS K7121: 2012. "(2) For measurement of melting temperature after a definite heat treatment" is adopted as the state conditioning of the test specimen, and 10° C./min is adopted as both the heating rate and the cooling rate.

When the expandable resin particles are released from the closed vessel together with the aqueous medium, it is preferable to pressurize the inside of the closed vessel with carbon dioxide, nitrogen, or the like, and to adjust the pressure so as to keep the pressure of the released closed vessel constant or gradually increase the pressure.

(Other Steps)

Before the expandable resin particles are expanded, the resin particles can be subjected to a specific heat treatment in a closed vessel. The heat treatment may be performed at any timing before impregnation with a blowing agent, during impregnation, or after impregnation, or may be performed at these two or more timings. By this heat treatment, expanded beads having a crystal structure in which a melting peak (intrinsic peak) derived from a crystal intrinsic to the polyolefin-based resin and a melting peak (high-temperature peak) located on a higher temperature side than the intrinsic peak appear in the DSC curve can be produced. For example, the resin particles are held at a temperature near the melting point of the polyolefin-based resin as the base material resin of the resin particles (more specifically, preferably, any temperature within a range of 15° C. lower than the melting point (Tm) (Tm−15° C.) or higher and lower than the melting end temperature (Te)) for a sufficient time (preferably about 5 minutes to 60 minutes). As a result, a part or all of the crystal intrinsic to the polyolefin-based resin are melted, and a part of the melted crystal is recrystallized to generate a high-potential crystal with a thick lamella. Thereafter, when the expandable resin particles having the high-potential crystal are expanded at the expanding temperature, it is possible to obtain expanded beads having a crystal structure in which the melted crystal is crystallized by cooling during expanding (intrinsic crystal) and the high-potential crystal. That is, expanded beads having a crystal structure in which an intrinsic peak and a high-temperature peak appear in a DSC curve can be obtained.

In particular, when expanded beads having a low apparent density (high expansion ratio) are obtained, the expanded beads obtained by the method are stored in a closed vessel that can be pressurized, a gas such as air is press-fitted into the vessel to perform an operation of increasing the internal pressure of the cells of the expanded beads by pressurization, and then the expanded beads are taken out from the vessel and heated using steam or hot air to be expanded again, and expanded beads having a high expansion ratio can be obtained.

(Colorant)

The expanded beads may include a colorant. From the viewpoint of achieving both the color developing property and the in-mold moldability of the expanded beads, the content of the colorant in the expanded beads is preferably 0.5 mass % or more and less than 10 mass %.

The polyolefin-based resin expanded beads of the present invention thus produced are excellent in uniformity of the cell diameter, and color unevenness of the surface of the resulting molded article is suppressed.

Based on the coefficient of variation of the cell diameter of the expanded beads, the uniformity of the cells of the expanded beads can be specified. The coefficient of variation of the cell diameter of the expanded beads of the present invention is preferably 0.40 or less, and more preferably 0.38 or less. From the viewpoint of the uniformity of the cells, the lower limit of the coefficient of variation is not particularly limited, but the lower limit is about 0.2.

In addition, the average value of the cell diameters of the expanded beads of the present invention is preferably 50 µm or more and 300 µm or less, more preferably 80 µm or more and 250 µm or less, and still more preferably 100 µm or more and 200 µm or less.

(Measurement of Cell Diameter of Expanded Beads)

The average value of the cell diameters of the expanded beads is determined as follows. The expanded beads are substantially divided into two so as to pass through the central part of the expanded beads, and a photograph of the cut surface is taken using a scanning electron microscope or the like. In the obtained cross-sectional photograph, 20 or more cells in the cut surface of the expanded beads are randomly selected. The cell diameter of each selected cell is measured. At this time, the maximum diameter of the cell is defined as the cell diameter. This operation is performed on at least 20 expanded beads, and the arithmetic average value of the cell diameters of respective cells is taken as the average value (average cell diameter) of the cell diameters of the expanded beads.

(Measurement of Coefficient of Variation in Cell Diameter of Expanded Beads)

The coefficient of variation of the cell diameter of the expanded beads is determined by dividing the standard deviation of the cell diameters of respective cells of the expanded beads by the average cell diameter of the expanded beads. Note that the value of the standard deviation is a value given by the square root of the unbiased variance.

The expanded beads of the present invention preferably have a crystal structure in which a melting peak (intrinsic peak) intrinsic to the polyolefin-based resin and a melting peak (high-temperature peak) located on a higher temperature side than the intrinsic peak appear in a DSC curve obtained by heating 1 to 3 mg of the expanded beads as a measurement sample at a heating rate of 10° C./min from 23° C. to 200° C. in accordance with JIS K7122: 2012.

With regard to the expanded beads of the present invention, the ratio of the amount of heat of fusion of the high-temperature peak to the total amount of heat of fusion in the DSC curve is more preferably 1/20 or more and 1/3 or less, and still more preferably 1/15 or more and 1/4 or less. The total amount of heat of fusion of the expanded beads is determined by the amount of crystals contained in the polyolefin-based resin as the base material resin, and the ratio of the amount of heat of fusion of the high-temperature peak to the total amount of heat of fusion is controlled by adjusting the temperature conditions and retention time of the crystallization step described later at the time of producing the expanded beads.

The total amount of heat of fusion in the DSC curve is measured as follows in the case of the DSC curve shown in FIG. 1. The melting end temperature (point returning to baseline) on the DSC curve is defined as β, and the point at 80° C. is defined as α. In addition, a straight line parallel to the vertical axis of the graph is drawn from a point γ on the DSC curve corresponding to the valley between the intrinsic peak Pa and the high-temperature peak Pb, and a point intersecting a straight line (α-β) connecting the point α and the point β is defined as δ. The area (A) of the intrinsic peak Pa is the amount of heat of the intrinsic peak Pa, and is obtained as the area of a part surrounded by a DSC curve showing the intrinsic peak Pa, a line segment (α-δ), and a line segment (γ-δ).

The area (B) of the high-temperature peak Pb is the amount of heat of the high-temperature peak Pb, and is obtained as an area of a part surrounded by a DSC curve showing the high-temperature peak Pb, a line segment (δ-β), and a line segment (γ-δ). The total amount of heat of fusion is a peak area surrounded by the straight line (α-β) and the DSC curve in the section between the point α and the point β, and is the sum of the area (A) of the intrinsic peak Pa and the area (B) of the high-temperature peak Pb, that is, [(A)+(B)].

The high-temperature peak Pb is observed in the DSC curve (first DSC curve) measured as described above, but is not observed in the DSC curve (second DSC curve) obtained when the temperature is lowered from 200° C. to around 23° C. at a cooling rate of 10° C./min and raised again to 200° C. at a heating rate of 10° C./min after obtaining the first DSC curve. It is possible to distinguish which peak the high-temperature peak is as compared with the DSC curve of the first time and the DSC curve of the second time.

As the measuring device, DSCQ1000 manufactured by TA Instruments can be used.

The average mass of the expanded beads is preferably 0.5 mg/bead or more and 10 mg/bead or less, and more preferably 1 mg/bead or more and 5 mg/bead or less.

The apparent density of the expanded beads is preferably 15 kg/m$^3$ or more and 300 kg/m$^3$ or less, and more preferably 20 kg/m$^3$ or more and 200 kg/m$^3$ or less.

The apparent density of the expanded beads is measured as follows. First, the state of the expanded beads is conditioned by leaving the expanded beads for 2 days under conditions of a relative humidity of 50%, a temperature of 23° C., and 1 atm. Next, a measuring cylinder containing water having a temperature of 23° C. is prepared, and an optional amount of expanded beads (mass W1 of expanded beads) is immersed in water in the measuring cylinder using a tool such as a wire mesh. Then, in consideration of the volume of the tool such as the wire mesh, the volume V1 [L] of the expanded beads read from the water level rise is measured. The apparent density [kg/m$^3$] of the expanded beads can be determined by dividing the mass W1 [g] of the expanded beads by the volume V1 [L] (W1/V1) and converting the unit.

The expanded beads can have a fusion-bonding layer on the surface thereof for enhancing the fusion-bonding property between the expanded beads during in-mold molding. The fusion-bonding layer may be present on the entire surface or a part of the surface of the expanded beads. Examples of the resin composition constituting the fusion-bonding layer include a crystalline polyolefin-based resin having a melting point lower than the melting point of the polyolefin-based resin included the expanded beads, an amorphous polyolefin-based resin having a softening point lower than the melting point of the polyolefin-based resin included the expanded beads, and an adhesive resin such as an ethylene-vinyl acetate copolymer or a urethane resin.

The method for forming the fusion-bonding layer on the surface of the expanded beads is not particularly limited, and examples thereof include a method for expanding the resin particles having the fusion-bonding layer, and a method for adhering the fusion-bonding layer to the expanded beads after obtaining the expanded beads. When resin particles having a fusion-bonding layer are expanded to obtain expanded beads, it is preferable to employ a method of disposing the fusion-bonding layer on the surfaces of resin particles by co-extrusion when producing resin particles.

For example, a polyolefin-based resin molten resin (core) and a resin for forming a fusion-bonding layer (sheath) are disposed in a sheath/core shape in a die, and the layered body is extruded into a strand shape to cut the strand, if appropriate. As a result, multilayer resin particles in which side surfaces of cylindrical resin particles are covered with a fusion-bonding layer are obtained. When the layered body is cut immediately after extrusion, it is also possible to obtain multilayer resin particles in which substantially the entire surface of the resin particles is covered with a fusion layer.

From the viewpoint of in-mold moldability, the rate of the fusion-bonding layer is preferably 0.5 mass % or more, and more preferably 1 mass % or more with respect to 100 mass % of the whole expanded beads having the fusion-bonding layer. From the viewpoint of the mechanical strength of the resulting molded article of expanded beads, the rate of the fusion-bonding layer is preferably 10 mass % or less, more preferably 5 mass % or less, and still more preferably 3 mass % or less.

When the fusion-bonding layer is in a non-expanded state, at least the expanded core layer of the expanded beads may contain the metal borate.

In the conventional expanded beads, when the expanded beads have a fusion-bonding layer, color unevenness of the resulting molded article of expanded beads tends to be increase than that of the expanded beads having no fusion-bonding layer. However, since the expanded beads of the present invention contain a specific metal borate, it is possible to obtain a molded article of expanded beads in which color unevenness is suppressed even if the expanded beads have a fusion-bonding layer.

(Molded Article of Expanded Beads)

When the expanded beads obtained by the present invention are filled in a molding mold and heated with a heating medium such as steam, the expanded beads are secondarily expanded and fuse-bonded to each other, so that a molded article of expanded beads having a desired shape as in the molding mold can be obtained. The resulting molded article of expanded beads has suppressed occurrence of color unevenness. In the conventional expanded beads, the presence or absence of occurrence of color unevenness is particularly remarkable in a colored molded article of expanded beads formed of expanded beads containing a colorant. However, in the molded article of expanded beads formed of expanded beads obtained by the present invention, the occurrence of color unevenness is effectively suppressed even when the molded article of expanded beads is colored.

EXAMPLES

Hereinafter, the present invention is described in detail based on Examples. However, the present invention is not limited to Examples. The results of the measurements for the evaluations of the Examples and the Comparative Examples are shown in Table 2 as appropriate.

As the polyolefin-based resin, the following resins were used.

PPa: Ethylene-propylene random copolymer (Ethylene content: 3.1 mass %, melting point: 142° C., melt flow rate (230° C., load 2.16 kg): 8 g/10 min)

PPb: Ethylene-propylene-butene random copolymer (Ethylene content: 3.1 mass %, butene content: 3.8 mass %, melting point: 133° C., melt flow rate (230° C., load 2.16 kg): 6 g/10 min)

As the metal borate, zinc borates (ZnB) shown in Table 1 were used.

TABLE 1

| Abbreviated Name | product name | Manufacturer | Arithmetic average particle diameter based on number μm | Number rate of particles having particle diameter of 3 μm or more % |
|---|---|---|---|---|
| ZnB1 | ZINBOREL-Fine | Larderello | 1.9 | 3 |
| ZnB2 | Firebrake ZB Fine | Borex | 2.8 | 10 |
| ZnB3 | ZINFLAM-ZB | Larderello | 2.4 | 7 |
| ZnB4 | 2335 | Tomits Pharmaceutical co., ltd. | 3.5 | 23 |
| ZnB5 | Firebrake ZB | Borez | 6.5 | 74 |

(Particle Size Distribution of Metal Borate)

Based on the method, the particle size distribution of the the metal borate was measured using MT3000 manufactured by MicrotracBEL Corp. A metal borate (1 g) and 1 g of a 1% aqueous solution of sodium dodecylbenzenesulfonate were added to 100 g of water to make a mixture, and the mixture was subjected to a dispersion treatment for 5 minutes using an ultrasonic shaker, and used as a measurement sample. Sample refractive index: 1.81, sample shape: non-spherical.

Carbon dioxide was used as the physical blowing agent.

As a colorant, a masterbatch for black coloring (colorant: carbon black (CB), concentration: 45 amount %, base material resin: PPc ethylene-propylene-butene random copolymer (ethylene content: 3.5 mass %, butene content: 2.5 mass %, melting point: 136° C., melt flow rate (230° C., load 2.16 kg): 7 g/10 min)) was used.

Examples 1 to 3 and Comparative Examples 1 and 2

(Preparation of Resin Particles)

A PPa and a metal borate were melt-kneaded with a pressure kneader to prepare a metal borate master batch having a metal borate concentration of 10 mass %.

93.5 parts by mass of a PPa, 0.5 parts by mass of a metal borate master batch, and 6 parts by mass of a black colorant master batch were supplied to an extruder, and these were melt-kneaded in the extruder to obtain a molten resin for forming a core layer. On the other hand, 94 parts by mass of a PPb and 6 parts by mass of the black colorant master batch were supplied to another extruder, and these were melt-kneaded in the extruder to obtain a molten resin for forming a fusion-bonding layer. These molten resins were joined into a sheath/core shape (the mass ratio of the core layer to the sheath layer (fusion-bonding layer) is 95:5) in a die, extruded into a strand shape, cooled in water, and then cut with a pelletizer to obtain multilayer resin particles having an average mass of 1.3 mg per particle.

(Preparation of Expanded Beads)

In an autoclave having a content volume of 2 m$^3$, 1050 L of water as an aqueous medium was charged, and 500 kg of the resin particles were dispersed in the aqueous medium. Furthermore, in an aqueous medium, 2 kg (0.4 parts by mass with respect to 100 parts by mass of resin particles) of kaolin as a dispersant, 30 g (0.006 parts by mass) of sodium dodecylbenzenesulfonate as a surfactant, and 65 g (0.013 parts by mass) of aluminum sulfate as a dispersion aid were added. While the contents in the autoclave were stirred and heated to the impregnation temperature shown in Table 2, carbon dioxide as a physical blowing agent was press-fitted into the autoclave so as to have the impregnation pressure shown in Table 2, and the autoclave was held at that temperature for 10 minutes. Thereafter, one end of the autoclave was opened, and the resin particles were released together with the aqueous medium under atmospheric pressure, and the resin particles were expanded to obtain black expanded beads. At the time of expanding, Table 2 shows the temperature of the content in the autoclave as the expanding temperature and the pressure inside the autoclave as the expanding pressure. The pressure in the autoclave was maintained at the expanding pressure by pressurizing the inside of the autoclave with carbon dioxide while the contents in the autoclave were released. The resulting expanded beads were dehydrated using a centrifuge, and then the expanded beads were cured in an atmosphere of atmospheric pressure to recover the pressure in the cells of the expanded beads.

The apparent density (expansion ratio), the average cell diameter, and the coefficient of variation of the cell diameter of the obtained expanded beads were measured. The results are shown in Table 2. The state of the expanded beads was conditioned by placing the expanded beads in an atmosphere of 23° C., a relative humidity of 50%, and 1 atm for 2 days, and then these measurements were performed.

(Apparent Density, Expansion Ratio)

Water (100 mL) at 23° C. was charged in a 200 mL measuring cylinder, and expanded beads having a bulk volume of about 50 mL were immersed in water in the measuring cylinder using a wire mesh after measuring the mass (W1) thereof. In consideration of the volume of the wire mesh, the volume V1 [L] of the expanded beads taken from the water level rise was measured. This operation was performed five times for different expanded beads samples, the apparent density of each expanded beads sample was determined from each measured value, and the arithmetic average value thereof was defined as the apparent density (kg/m$^3$) of the expanded beads.

The expansion ratio of the expanded beads was determined by setting the density of the resin particles before expansion to 900 kg/m$^3$ and dividing the density of the resin particles by the apparent density of the expanded beads.

(Average Cell Diameter, Coefficient of Variation of Cell Diameter)

From the obtained expanded beads, 20 expanded beads were randomly selected as measurement samples. The expanded beads were substantially divided into two so as to pass through the central part of the expanded beads, and a photograph of the cut surface is taken using a scanning electron microscope. In the obtained cross-sectional photograph, 20 cells on the cut surface of the expanded beads were randomly selected. The maximum diameter of each cell was measured, and the value was taken as the cell diameter of each cell. This operation was performed on 20 expanded beads selected as measurement samples, and the average cell diameter (μm) of the expanded beads was determined by arithmetically averaging the cell diameters of the respective cells.

The standard deviation of the cell diameters of respective cells of the expanded beads was divided by the average cell diameter of the expanded beads to determine the coefficient of variation of the cell diameter. The value given by the square root of the unbiased variance was taken as the standard deviation.

(High-Temperature Peak)

The total amount of heat of fusion and the amount of heat of fusion at a high-temperature peak (amount of heat of high-temperature peak) of the expanded beads were measured by a method in accordance with JIS K7122: 2012 described above.

(Evaluation of Expandability)

Based on the value obtained by dividing the expansion ratio of the expanded beads by the expansion pressure [MPa (gauge pressure: G)], the expandability was evaluated according to the following criteria. The larger the value is, the better the expanding efficiency is.

AA (Excellent): 5.5 or more
A (Good): 5.0 or more and less than 5.5
B (Poor): less than 5.0

(Preparation of Molded Article)

As a molding mold, a mold having a rectangular parallelepiped molding cavity with internal dimensions of 300 mm in the longitudinal direction, 250 mm in the lateral direction, and 60 mm in the thickness direction.

The expanded beads were charged in a pressurized tank, and the inside of the pressurized tank was pressurized with air to increase the internal pressure of cells of the expanded beads. The internal pressure of the cells of the expanded beads taken out from the pressurized tank was 0.2 MPa (absolute pressure).

Expanded beads were filled into the molding cavity in a state where the mold was opened by 6 mm (the dimension of the molding cavity in the thickness direction at this time was 66 mm) from a state where the mold was completely closed. After completion of filling, the mold was completely closed (cracking amount: 6 mm, 10%). Thereafter, steam of 0.3 MPa (G) was supplied into the molding cavity to heat the expanded beads, and the expanded beads were secondarily expanded and fuse-bonded to form a molded article of expanded beads. The mold was cooled with water until the surface pressure of the molded article of expanded beads in the mold reached 0.04 MPa (G), and then the mold was opened, and the molded article of expanded beads was taken out from the mold. The obtained molded article of expanded beads was cured for 24 hours under an atmosphere at atmospheric pressure and a temperature of 60° C.

The moldability of the expanded beads was evaluated according to the following criteria from the viewpoint of the surface property, fusion-bonding property, and recovery property of the obtained molded article of expanded beads.

(Surface Property)

A (Good): The molded article of expanded beads is shaped up to the corner of the molded article of expanded beads, and there is no excessive void between the expanded beads on the surface of the molded article.

C (Bad): The corner of the molded article of expanded beads is not shaped, or there are excessive voids between the expanded beads on the surface of the molded article.

(Fusion-Bonding Property)

A (Good): The fusion-bonding rate is 70% or more.
C (Bad): The fusion-bonding rate is less than 70%.

A cut was made in the plate surface (surface corresponding to the surface of 300 mm×250 mm of the molding cavity) of the molded article of expanded beads up to the center position in the thickness direction so as to divide the length in the longitudinal direction into two equal parts using a cutter knife. The molded article of expanded beads was bent and broken from the cut position. The number (C1) of all the expanded beads present on the broken surface and the number (C2) of the expanded beads destroyed therein were measured, and C2 was divided by C1 to determine the fusion-bonding rate (%) of the molded article of expanded beads.

(Recovery Property)

A (Good): Each surface of the molded article of expanded beads does not have excessive swelling and excessive recess, and no warpage occurs in the molded article of expanded beads.

C (Bad): Each surface of the molded article of expanded beads has excessive swelling or excessive recess, or a warpage occurs in the molded article of expanded beads.

(Moldability)

A (Good): All the evaluations of surface property, fusion-bonding property, and recovery property are evaluated as "A".

C (Bad): One or more of evaluations of surface property, fusion-bonding property, and recovery property are evaluated as "C".

(Productivity)

The productivity of the molded article of expanded beads was evaluated according to the following criteria based on the water cooling time during in-mold molding.

A (Good): The water cooling time is within 200 seconds.
C (Bad): The water cooling time exceeds 200 seconds.

The coefficient of variation in the L value of the plate surface and the coefficient of variation in the L value of the cross section of the molded article of expanded beads were measured, and the color unevenness (appearance) of the molded article of expanded beads was evaluated according to the following criteria.

A (Good): The coefficient of variation of the L value is 0.25 or less in the plate surface of the molded article of expanded beads, and the coefficient of variation of the L value is 0.25 or less also in the cross section.

B (Poor): The coefficient of variation of the L value on the plate surface of the molded article of expanded beads is 0.25 or less, but the coefficient of variation of the L value on the cross section exceeds 0.25.

C (Bad): The coefficient of variation of the L value on the plate surface of the molded article of expanded beads exceeds 0.25.

30 sites were randomly selected from the plate surface of the molded article of expanded beads, and the L value of the surface of the molded article of expanded beads was measured using a micro surface spectrophotometer ("VSS 7700" manufactured by NIPPON DENSHOKU INDUSTRIES CO., LTD.). The coefficient of variation of the L value of the surface was determined by dividing the standard deviation of the L value by the arithmetic average value. In addition, the expanded beads were divided into two so as to be equally divided into two in the thickness direction, 30 sites were randomly selected from one of the cross sections, and the coefficient of variation of the L value of the cross section was determined in the same manner.

In addition, the color unevenness was visually evaluated by five-grade evaluation from significant color unevenness (1 point) to no color unevenness (5 points) on the plate surface of the molded article of expanded beads, and the color unevenness of the molded article of expanded beads was evaluated according to the following criteria based on the average value of the evaluations by five viewers.

AA (Excellent): 4 points or more
A (Good): 3.5 points or more and less than 4 points
B (Poor): 3 points or more and less than 3.5 points
C (Bad): Less than 3 points (Compressive Property)

A test piece of 50 mm (length)×50 mm (width)×25 mm (thickness) was cut out from the central part of the molded article of expanded beads (a molding skin is not included). The test piece was placed in an atmosphere of 23° C. and a relative humidity of 50% for 24 hours to condition the state of the test piece. In accordance with JIS K6767: 1999, a test piece was compressed to a thickness of 5 mm (20% of the thickness of the test piece before compression: 80% compression) at a compression rate of 10 mm/min, and the compressive strength at 50% compression was measured. Based on the compressive strength, the mechanical strength of the molded article of expanded beads was evaluated according to the following criteria.

A (Good): 290 kPa or more
C (Bad): Less than 290 kPa (2) The polyolefin-based resin expanded beads according to claim 1, wherein a content of the metal borate in the expanded beads is 50 ppm by mass or more and 5000 ppm by mass or less.

(3) The polyolefin-based resin expanded beads according to claim 1 or 2, wherein the expanded beads contain a colorant, and a content of the colorant in the expanded beads is 0.5 mass % or more and less than 10 mass %.

(4) The polyolefin-based resin expanded beads according to any one of claims 1 to 3, wherein an average value of cell diameters of the expanded beads is 50 μm or more and 300 μm or less, and a coefficient of variation of the cell diameters is 0.40 or less.

(5) The polyolefin-based resin expanded beads according to any one of claims 1 to 4, wherein the metal borate is the zinc borate.

TABLE 2

| | | | | | Example 1 | Example 2 | Example 3 | Comparative Example 1 | Comparative Example 2 |
|---|---|---|---|---|---|---|---|---|---|
| Resin particles | Core layer | Metal borate | Abbreviated Name | — | ZnB1 | ZnB2 | ZnB3 | ZnB4 | ZnB5 |
| | | | Average particle diameter | μm | 1.9 | 2.8 | 2.4 | 3.5 | 6.5 |
| | | | Rate of 5 μm or more | % | 3 | 10 | 7 | 23 | 74 |
| | | | Formulation amount | weight ppm | 500 | 500 | 500 | 500 | 500 |
| | | Colorant | Kind | — | C8 | C8 | C8 | C8 | C8 |
| | | | Formulation amount | weight % | 2.7 | 2.7 | 2.7 | 2.7 | 2.7 |
| | Fusion Layer | Colorant | Kind | — | C8 | C8 | C8 | C8 | C8 |
| | | | Formulation amount | weight % | 2.7 | 2.7 | 2.7 | 2.7 | 2.7 |
| | Core layer/fusion-bonding layer (sheath layer) ratio by weight | | | — | 95/5 | 95/5 | 95/5 | 95/5 | 95/5 |
| Expanding conditions | Blowing Agent | | | — | $CO_2$ | $CO_2$ | $CO_2$ | $CO_2$ | $CO_2$ |
| | Impregnation temperature | | | °C. | 148 | 148 | 148 | 148 | 148 |
| | Impregnation pressure | | | MPa (G) | 2.8 | 2.9 | 2.9 | 2.9 | 3.2 |
| | Expanding temperature | | | 0°C. | 148 | 148 | 148 | 148 | 148 |
| | Expanding pressure | | | MPa (G) | 2.8 | 2.9 | 2.9 | 2.9 | 3.2 |
| Expanded beads | Apparent density | | | kg/m³ | 54.3 | 63.2 | 56.0 | 58.3 | 60.8 |
| | Expansion ratio | | | fold | 16.6 | 14.3 | 16.1 | 15.4 | 14.8 |
| | Average cell diameters | | | μm | 160 | 179 | 146 | 112 | 198 |
| | Coefficient of variation | | | — | 0.35 | 0.37 | 0.36 | 0.49 | 0.45 |
| | Total amount of heat of fusion | | | J/g | 69 | 69 | 69 | 69 | 69 |
| | Amount of heat of high-temperature peak | | | J/g | 14 | 14 | 14 | 14 | 14 |
| Expendability | Ratio/Expansion pressure | | | /MPa (G) | 5.9 | 5.0 | 5.6 | 5.4 | 4.6 |
| | Evaluation | | | — | AA | A | AA | A | B |
| Moldability | Surface Property | | | — | A | A | A | A | A |
| | Fusion-bonding Property | | | — | A | A | A | A | A |
| | Recovery property | | | — | A | A | A | A | A |
| | Moldability | | | — | A | A | A | A | A |
| | Productivity | | | — | A | A | A | A | A |
| Molded article of expanded beads | Appearance | L value | | — | A | A | A | B | C |
| | | Visual observation | | — | AA | A | AA | B | C |
| | Compressive Property | | | — | A | A | A | A | A |

The embodiment includes the following technical ideas.

(1) Polyolefin-based resin expanded beads obtained by expanding polyolefin-based resin particles including one or two or more metal borates selected from zinc borate and magnesium borate, wherein the particles of the metal borate has an arithmetic average particle diameter based on the number of 1 μm or more, and a number rate of the particles of the metal borate having a particle diameter of 5 μm or more is 20% or less.

(6) A molded article of polyolefin-based resin expanded beads obtained by in-mold molding the polyolefin-based resin expanded beads according to any one of claims 1 to 5.

(7) A method for producing polyolefin-based resin expanded beads by releasing expandable polyolefin-based resin particles containing one or two or more metal borates selected from zinc borate and magnesium borate and a physical blowing agent dispersed in an aqueous medium in a closed vessel together with the aqueous medium from the closed vessel to a low pressure region than an inside of the closed vessel to expand the expandable polyolefin-based resin particles, the method comprising:

using a metal borate having an arithmetic average particle diameter based on the number of 1 μm or more and a number rate of the particles having a particle diameter of 5 μm or more of 20% or less as the metal borate.

REFERENCE SIGNS LIST

β Melting end temperature
α Point at 80° C.
Pa Intrinsic peak
Pb High-temperature peak
γ, δ Point
(A), (B) Area

The invention claimed is:

1. Polyolefin-based resin expanded beads obtained by expanding polyolefin-based resin particles including one or two or more metal borates selected from zinc borate and magnesium borate,
   wherein the particles of the metal borate has an arithmetic average particle diameter based on the number of particles of 1 μm or more, and a number rate of the particles of the metal borate having a particle diameter of 5 μm or more is 20% or less, and
   wherein a content of the metal borate in the expanded beads is 50 ppm by mass or more and 5000 ppm by mass or less.

2. The polyolefin-based resin expanded beads according to claim 1, wherein the expanded beads contain a colorant, and a content of the colorant in the expanded beads is 0.5 mass % or more and less than 10 mass %.

3. The polyolefin-based resin expanded beads according to claim 1, wherein an average value of cell diameters of the expanded beads is 50 μm or more and 300 μm or less, and a coefficient of variation of the cell diameters is 0.40 or less.

4. The polyolefin-based resin expanded beads according to claim 1, wherein the metal borate is the zinc borate.

5. A molded article of polyolefin-based resin expanded beads obtained by in-mold molding the polyolefin-based resin expanded beads according to claim 1.

6. A method for producing the expanded beads according to claim 1 by releasing expandable polyolefin-based resin particles containing one or two or more metal borates selected from zinc borate and magnesium borate and a physical blowing agent dispersed in an aqueous medium in a closed vessel together with the aqueous medium from the closed vessel to a lower pressure region than an inside of the closed vessel to expand the expandable polyolefin-based resin particles.

7. Polyolefin-based resin expanded beads obtained by expanding polyolefin-based resin particles including one or two or more metal borates selected from zinc borate and magnesium borate,
   wherein the particles of the metal borate has an arithmetic average particle diameter based on the number of 1 μm or more, and a number rate of the particles of the metal borate having a particle diameter of 5 μm or more is 20% or less,
   wherein an average value of cell diameters of the expanded beads is 50 μm or more and 300 μm or less, and a coefficient of variation of the cell diameters is 0.40 or less.

8. The polyolefin-based resin expanded beads according to claim 7, wherein the expanded beads contain a colorant, and a content of the colorant in the expanded beads is 0.5 mass % or more and less than 10 mass %.

9. The polyolefin-based resin expanded beads according to claim 7, wherein the metal borate is the zinc borate.

10. A molded article of polyolefin-based resin expanded beads obtained by in-mold molding the polyolefin-based resin expanded beads according to claim 7.

* * * * *